(12) United States Patent
Yoda et al.

(10) Patent No.: US 11,747,175 B2
(45) Date of Patent: Sep. 5, 2023

(54) UTILITY POLE LOCATION SPECIFYING SYSTEM, UTILITY POLE LOCATION SPECIFYING APPARATUS, UTILITY POLE LOCATION SPECIFYING METHOD, AND NON-TRANSITORY COMPUTER READABLE MEDIUM

(71) Applicant: NEC Corporation, Tokyo (JP)

(72) Inventors: Yukihide Yoda, Tokyo (JP); Yoshiaki Aono, Tokyo (JP); Koji Asahi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 133 days.

(21) Appl. No.: 17/270,317

(22) PCT Filed: Apr. 8, 2019

(86) PCT No.: PCT/JP2019/015345
§ 371 (c)(1),
(2) Date: Feb. 22, 2021

(87) PCT Pub. No.: WO2020/044648
PCT Pub. Date: Mar. 5, 2020

(65) Prior Publication Data
US 2021/0172767 A1 Jun. 10, 2021

(30) Foreign Application Priority Data
Aug. 30, 2018 (JP) ................................. 2018-162040

(51) Int. Cl.
*G01D 5/353* (2006.01)

(52) U.S. Cl.
CPC .................................. *G01D 5/353* (2013.01)

(58) Field of Classification Search
CPC ...... G01D 5/353; G01D 5/35358; H02G 1/02; H02G 7/00; G01H 9/004
See application file for complete search history.

(56) References Cited

U.S. PATENT DOCUMENTS

| | | | |
|---|---|---|---|
| 2006/0153517 A1 | 7/2006 | Reagan et al. | |
| 2014/0262434 A1* | 9/2014 | Stransky | H02G 7/00 29/887 |

(Continued)

FOREIGN PATENT DOCUMENTS

| | | |
|---|---|---|
| CN | 202818621 U | 3/2013 |
| CN | 205788588 U | 12/2016 |

(Continued)

OTHER PUBLICATIONS

International Search Report for PCT Application No. PCT/JP2019/015345, dated Jul. 9, 2019.

(Continued)

*Primary Examiner* — Tony Ko

(57) ABSTRACT

A utility pole location specifying system according to the present disclosure includes a cable (20) containing a communication optical fiber disposed in a utility pole (10), a receiving unit (331) configured to receive an optical signal containing a characteristic pattern of the utility pole (10) from at least one communication optical fiber contained in the cable (20), and a specifying unit (332) configured to specify a location of the utility pole (10) based on the characteristic pattern.

15 Claims, 19 Drawing Sheets

(56) References Cited

U.S. PATENT DOCUMENTS

2016/0371657 A1 12/2016 Butera
2017/0099079 A1 4/2017 Gross et al.

FOREIGN PATENT DOCUMENTS

| EP | 2846316 A1 | 3/2015 |
|---|---|---|
| JP | H06-105461 A | 4/1994 |
| JP | 2006-338577 A | 12/2006 |
| JP | 2007-183166 A | 7/2007 |
| JP | 2008-067467 A | 3/2008 |
| JP | 2015-053832 A | 3/2015 |

OTHER PUBLICATIONS

Extended European Search Report for EP Application No. EP19853989.2 dated Oct. 4, 2021.
Chinese Office Action for CN Application No. 201980052763.1 dated Dec. 16, 2021 with English Translation.
Chinese Office Action for CN Application No. 201980052763.1, dated Sep. 5, 2022 with English Translation.

* cited by examiner

|  | DISTANCE FROM FIBER SENSING UNIT |
|---|---|
| LOCATION OF UTILITY POLE | xx km |
|  | yy km |
|  | zz km |

Fig. 3

| UTILITY POLE NUMBER | DISTANCE FROM FIBER SENSING UNIT |
|---|---|
| A | xx km |
| B | yy km |
| C | zz km |

Fig. 5

UTILITY POLE LOCATION SPECIFYING SYSTEM, UTILITY POLE LOCATION SPECIFYING APPARATUS, UTILITY POLE LOCATION SPECIFYING METHOD, AND NON-TRANSITORY COMPUTER READABLE MEDIUM

This application is a National Stage Entry of PCT/JP2019/015345 filed on Apr. 8, 2019, which claims priority from Japanese Patent Application 2018-162040 filed on Aug. 30, 2018, the contents of all of which are incorporated herein by reference, in their entirety.

TECHNICAL FIELD

The present disclosure relates to a utility pole location specifying system, a utility pole location specifying apparatus, a utility pole location specifying method, and a non-transitory computer readable medium.

BACKGROUND ART

Conventionally, abnormalities of utility poles are often detected manually. For example, a worker determines an abnormality only by a visual observation, or taps on a utility pole and determines an abnormality based on reverberating sound or the like. However, when an abnormality of a utility pole is manually detected, it takes large amounts of time and cost, and thus in some cases, detecting an abnormality and coping therewith are delayed.

Therefore, recently, a system for monitoring a utility pole for detecting an abnormality thereof by using an optical fiber has been proposed (e.g., Patent Literatures 1 and 2).

In a technique disclosed in Patent Literature 1, an optical fiber is linearly or spirally disposed in the vertical direction of a utility pole. When a utility pole is broken by a collision of an automobile with the utility pole, the optical fiber is severely bent, so that a loss occurs in an optical signal propagating through the inside of the optical fiber. In this way, it is detected that one of a plurality of utility poles has been broken by detecting the amount of a loss caused by the above-described loss through OTDR (Optical Time-Domain Reflectometry) measurement.

Further, in a technique disclosed in Patent Literature 2, a nesting detection core line, which is composed of an optical fiber for detecting nesting in a utility pole, is disposed. When the nesting detection core line is warped due to nesting in the utility pole, the nesting detection core line is distorted, e.g., is bent or stretched, so that the strength of an optical signal propagating through the inside of the nesting detection core line is attenuated. As a result, it is detected that a nest has been made by detecting the amount of a loss caused by this attenuation through OTDR measurement.

CITATION LIST

Patent Literature

Patent Literature 1: Japanese Unexamined Patent Application Publication No. 2008-067467
Patent Literature 2: Japanese Unexamined Patent Application Publication No. 2015-053832

SUMMARY OF INVENTION

Technical Problem

As automated monitoring of utility poles for detecting abnormalities thereof has been becoming more common, it is likely that demands for techniques for specifying locations of utility poles and automatically finding which utility poles are monitored will increase.

Note that, in the techniques disclosed in Patent Literatures 1 and 2, the location of a utility pole is specified by monitoring the amount of an optical loss through OTDR measurement and measuring a distance from a monitoring apparatus to a place where the loss has occurred.

However, in the techniques disclosed in Patent Literatures 1 and 2, there is a problem that in order to specify the location of a utility pole, it is necessary to have information about a correspondence relation between distances from the monitoring apparatus and all the utility poles in advance.

Therefore, an object of the present disclosure is to solve the above-described problem and to provide a utility pole location specifying system, a utility pole location specifying apparatus, a utility pole location specifying method, and a non-transitory computer readable medium capable of accurately and automatically specifying the location of a utility pole.

Solution to Problem

A utility pole location specifying system according to one aspect includes:
a cable disposed in a utility pole, the cable containing a communication optical fiber;
a receiving unit configured to receive an optical signal containing a characteristic pattern of the utility pole from at least one communication optical fiber contained in the cable; and
a specifying unit configured to specify a location of the utility pole based on the characteristic pattern.

A utility pole location specifying apparatus according to another aspect includes:
a receiving unit configured to receive an optical signal containing a characteristic pattern of a utility pole from at least one communication optical fiber contained in a cable disposed in the utility pole; and
a specifying unit configured to specify a location of the utility pole based on the characteristic pattern.

A utility pole location specifying method according to another aspect is a utility pole location specifying method performed by a utility pole location specifying apparatus, including:
receiving an optical signal containing a characteristic pattern of a utility pole from at least one communication optical fiber contained in a cable disposed in the utility pole; and
specifying a location of the utility pole based on the characteristic pattern.

A non-transitory computer readable medium according to another aspect is a non-transitory computer readable medium storing a program for causing a computer to perform:
a process of receiving an optical signal containing a characteristic pattern of a utility pole from at least one communication optical fiber contained in a cable disposed in the utility pole; and
a process of specifying a location of the utility pole based on the characteristic pattern.

Advantageous Effects of Invention

According to the above-described aspect, it is possible to achieve an advantageous effect that the location of a utility pole can be accurately and automatically specified.

BRIEF DESCRIPTION OF DRAWINGS

FIG. 3 shows an example of a result of the specifying of the location of each of utility poles by the first method performed in a utility pole location specifying system according to an example embodiment;

FIG. 5 shows an example of a result of the specifying of the location of each of utility poles by the second method performed in a utility pole location specifying system according to an example embodiment;

DESCRIPTION OF EMBODIMENTS

Example embodiments according to the present disclosure will be described hereinafter with reference to the drawings.

EXAMPLE EMBODIMENT

Configuration of Example Embodiment

Firstly, a configuration of a utility pole location specifying system according to this example embodiment will be described with reference to FIG. 1. Note that, in FIG. 1, only three utility poles 10 are shown for simplifying the explanation. Further, the three utility poles 10 are indicated by utility pole numbers A, B and C, respectively.

Figure 1:
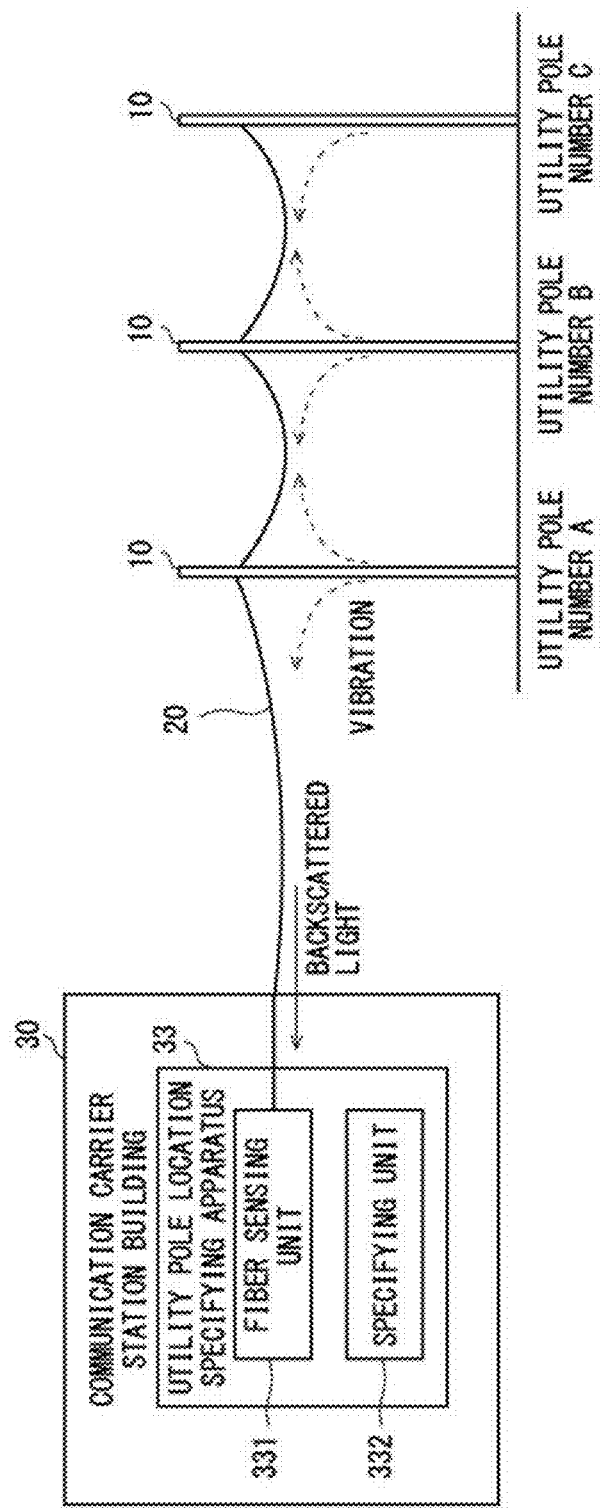
FIG. 1 shows an example of a configuration of a utility pole location specifying system according to an example embodiment.

As shown in FIG. 1, the utility pole location specifying system according to this example embodiment is a system for specifying the locations of the utility poles 10, and includes an optical fiber cable 20 and a utility pole location specifying apparatus 33.

The optical fiber cable 20 is strung (e.g., stretched) through the utility poles 10. When the optical fiber cable 20 is strung through the utility poles 10, it is strung (e.g., stretched) substantially perpendicular to the longitudinal direction of the utility poles 10.

The optical fiber cable 20 is a cable containing at least one communication optical fiber. One end of the optical fiber cable 20 is routed to the inside of a communication carrier station building 30, and the other end thereof is terminated at the utility pole 10 having the utility pole number C.

The utility pole location specifying system according to this example embodiment specifies the locations of the utility poles 10 by using an optical fiber sensing technique in which the optical fiber is used as a sensor.

Specifically, pulsed light is made to enter the communication optical fiber contained in the optical fiber cable 20 inside the communication carrier station building 30. As a result, as the pulsed light is transmitted through the communication optical fiber toward the utility poles 10, backscattered light is generated each time the pulsed light travels a certain transmission distance. The backscattered light returns to the inside of the communication carrier station building 30 through the same communication optical fiber.

Note that the utility poles 10 vibrate due to disturbances from the surrounding environment or naturally vibrate, and the vibrations of the utility poles 10 are transmitted to the communication optical fiber. It should be noted that the parts of the optical fiber cable 20 which are not disposed in the utility poles 10 also naturally vibrate. However, the vibration patterns of the utility poles 10 are patterns characteristic of the utility poles 10 and are different from the vibration patterns of the parts of the optical fiber 20 which are not disposed in the utility poles 10.

Therefore, the backscattered light returning to the inside of the communication carrier station building 30 contains the characteristic patterns of the utility poles 10. In the example shown in FIG. 1, since the three utility poles 10 are provided, the backscattered light returning to the inside of the communication carrier station building 30 contains the characteristic patterns corresponding the three utility poles 10.

The utility pole location specifying system according to this example embodiment specifies the locations of the utility poles 10 by utilizing the fact that the pattern of the backscattered light returning to the inside of the communication carrier station building 30 contains the characteristic patterns of the utility poles 10.

Note that the above-described utility pole location specifying apparatus 33 is provided inside the communication carrier station building 30. The utility pole location specifying apparatus 33 is equipment that is newly installed in order to implement this example embodiment.

The utility pole location specifying apparatus 33 is an apparatus having a function of specifying the locations of the utility poles 10 in addition to the functions as the optical fiber sensing apparatus. Specifically, the utility pole location specifying apparatus 33 includes a fiber sensing unit 331 and a specifying unit 332. The fiber sensing unit 331 is an example of the receiving unit.

The fiber sensing unit 331 makes pulsed light enter at least one communication optical fiber contained in the optical fiber cable 20. This pulsed light is transmitted toward the utility poles 10. Further, the fiber sensing unit 331 receives backscattered light of the pulsed light from the same communication optical fiber to which the pulsed light has entered. This backscattered light is received in the direction from the utility poles 10.

Note that, as described above, the backscattered light received by the fiber sensing unit 331 contains the characteristic patterns of the utility poles 10.

Therefore, the specifying unit 332 specifies the locations of the utility poles 10 based on the characteristic patterns of the utility poles 10 contained in the backscattered light received by the fiber sensing unit 331.

Next, several methods in which the specifying unit 332 specifies the locations of the utility poles 10 based on the characteristic patterns of the utility poles 10 contained in the backscattered light received by the fiber sensing unit 331 will be described.

(1) First Method

Figure 2:
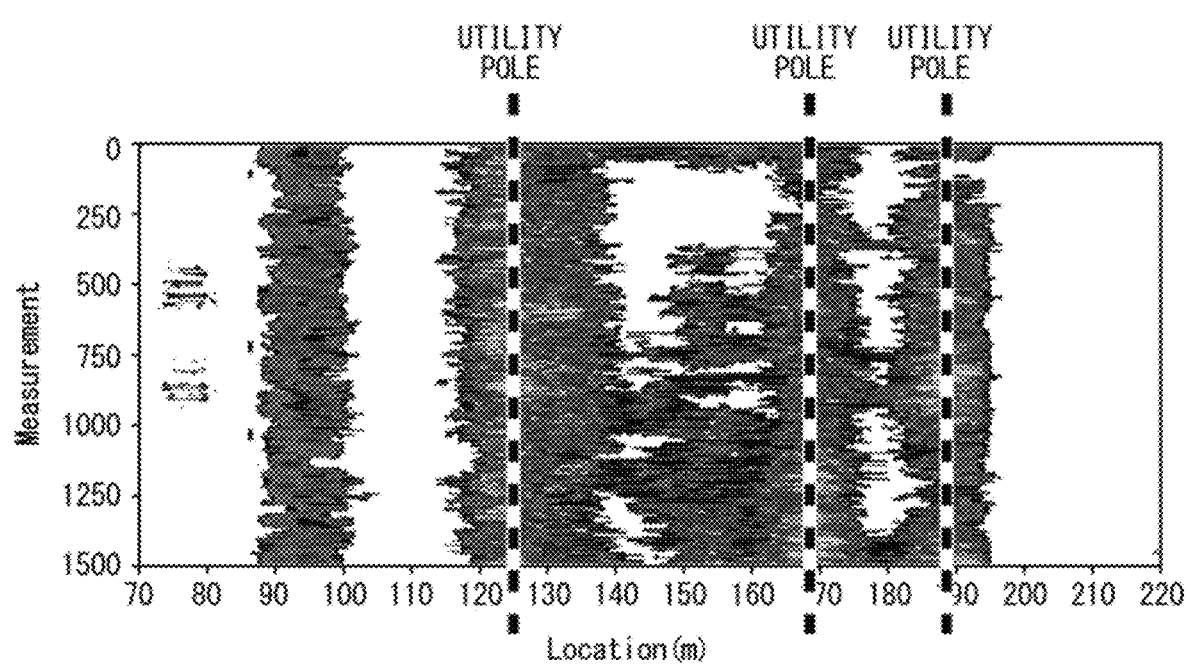
FIG. 2 shows an example of vibration data at each distance used in a first method performed in a utility pole location specifying system according to an example embodiment.

Firstly, a first method for specifying the locations of utility poles 10 will be described with reference to FIG. 2. FIG. 2 shows vibration data at each distance from the fiber sensing unit 331 (in which, a horizontal axis indicates distances and a vertical axis indicates time of occurrences). In FIG. 2, the density of shading in a section in which a utility pole vibrates is changed according to the magnitude of the vibration. Note that the vibration data at each distance shown in FIG. 2 was obtained by the fiber sensing unit 331 by detecting backscattered light received from the communication optical fiber by using a distributed acoustic sensor (Distributed Acoustic Sensor) and a distributed vibration sensor (Distributed Vibration Sensor).

In the first method, vibrations that are non-artificially generated in the utility pole 10 due to changes in the surrounding environments are used.

When the specifying unit 332 specifies the locations of the utility poles 10, it first acquires vibration data at each distance like the one shown in FIG. 2 from the fiber sensing unit 331.

In the vibration data at each distance shown in FIG. 2, vibrations occur at several places different distances away from the fiber sensing unit 331.

Therefore, for example, the specifying unit 332 determines a section in which the number of times of vibrations in a certain period is equal to or greater than a threshold as a section in which a characteristic pattern of a utility pole 10 occurs, and specifies the center of that section as the location of the utility pole 10.

Alternatively, the specifying unit 332 determines a section in which the magnitude of vibrations is equal to or greater than a threshold as a section in which a characteristic pattern of a utility pole 10 occurs, and specifies a point in that section at which vibrations having the maximum magnitude occur as the location of the utility pole 10.

In the example shown in FIG. 2, the specifying unit 332 specifies places about 125 m, 168 m, and 188 m away from the fiber sensing unit 331 as the locations of utility poles 10. FIG. 3 shows an image of a result of the specified location of each utility pole 10.

(2) Second Method

Figure 4:
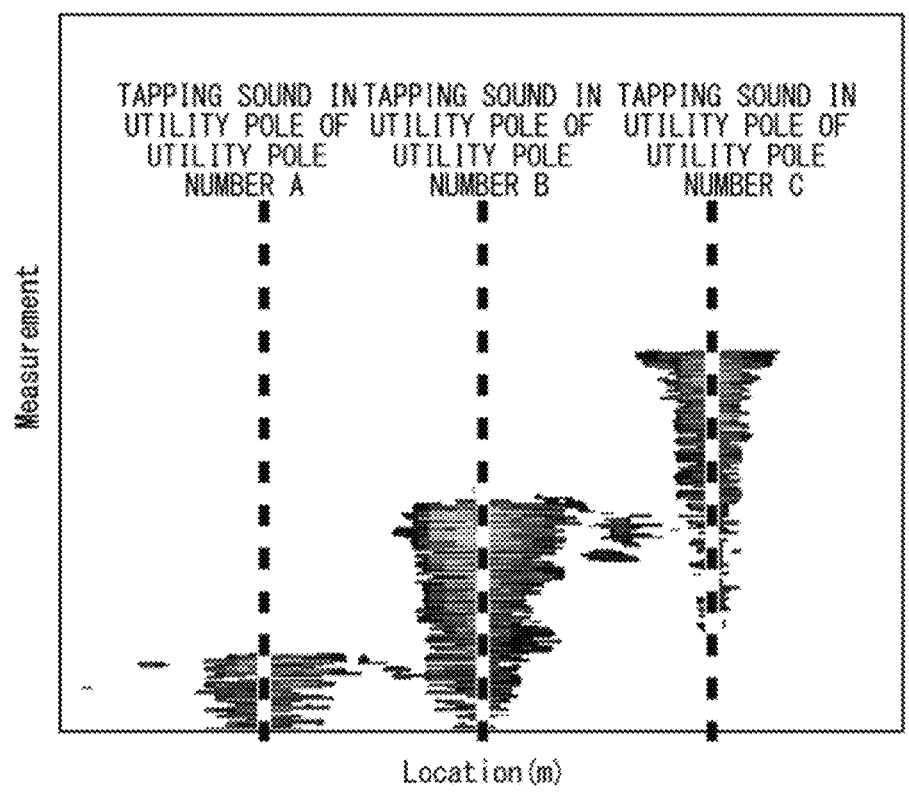
FIG. 4 shows an example of vibration data at each distance used in a second method performed in a utility pole location specifying system according to an example embodiment.

Next, a second method for specifying the locations of utility poles 10 will be described with reference to FIG. 4. FIG. 4 shows vibration data at each distance from the fiber sensing unit 331 (in which, a horizontal axis indicates distances and a vertical axis indicates time of occurrences). In FIG. 4, the density of shading in a section in which a utility pole vibrates is changed according to the magnitude of the vibration. Note that the vibration data shown in FIG. 4 was obtained by the fiber sensing unit 331 by detecting backscattered light received from the communication optical fiber by using a distributed acoustic sensor and a distributed vibration sensor.

In the second method, a user taps on a utility pole 10 with a hammer or the like and thereby artificially generates vibrations in the utility pole 10, and the generated artificial vibrations are used.

For example, when artificial vibrations are generated in the utility pole 10 having the utility pole number A, vibrations occur at a point corresponding to the distance from the fiber sensing unit 331 to the utility poles 10 having the utility pole number A in the vibration data at each distance shown in FIG. 4.

Therefore, when the specifying unit 332 specifies the locations of utility poles 10, it first acquires vibration data at each distance like the one shown in FIG. 4. Then, the specifying unit 332 determines a pattern of the vibrations artificially generated in the utility pole 10 having the utility pole number A as a characteristic pattern of the utility pole 10, and specifies a point in the section where the characteristic pattern of the utility poles 10 occurs as the location of the utility pole 10 having the utility pole number A. The method for specifying the point in the above-described method may be similar to that used in the first method. The positions of the utility poles 10 having the utility pole numbers B and C are also specified in a similar manner. FIG. 5 shows an image of a result of the specified location of each utility pole 10. In the second method, since a user taps on the utility poles 10 with a hammer or the like while recognizing which utility pole 10 he/she is tapping on, it is possible to associate the utility pole number of the utility pole 10 with the location of the utility pole 10.

(3) Third Method

Figure 6:
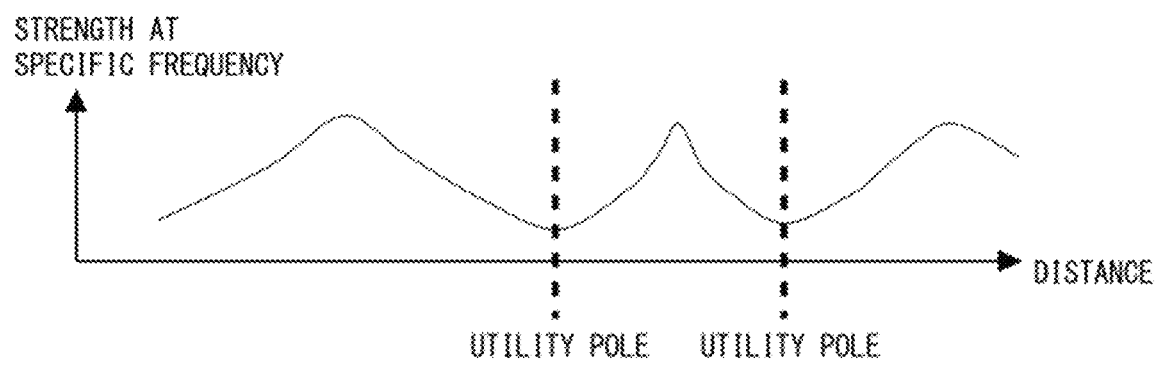
FIG. 6 shows an example of vibration data at each distance used in a third method performed in a utility pole location specifying system according to an example embodiment.

Next, a third method for specifying the locations of utility poles 10 will be described with reference to FIG. 6. FIG. 6 shows vibration data at each distance from the fiber sensing unit 331 (in which, a horizontal axis indicates distances and a vertical axis indicates magnitudes (amplitudes) at a specific frequency). Note that the vibration data shown in FIG. 6 was obtained by the fiber sensing unit 331 by detecting backscattered light received from the communication optical fiber by using a distributed acoustic sensor and a distributed vibration sensor.

The third method uses a fact that while parts of the optical fiber cable 20 disposed between the utility poles 10 are greatly affected by outside environments such as a wind, the utility poles 10 themselves are less likely to be affected by these outside environments.

That is, since parts of the optical fiber cable 20 disposed between utility poles 10 widely vibrates due to a wind or the like, the magnitude of vibrations at the vibration frequency of the vibrations caused by a wind or the like increases. Meanwhile, the magnitude of vibrations at the vibration frequency of the vibrations of the utility poles 10 decreases.

FIG. 6 shows vibration data at each distance in which a vibration frequency of vibrations caused by a wind or the like is used as a specific frequency. In the vibration data at each distance shown in FIG. 6, there are parts having large magnitudes, and these parts can be determined as the central parts of the parts of the optical fiber cable 20 disposed between the utility poles 10. Meanwhile, there are parts having small magnitudes, and these parts can be determined as parts where utility poles 10 are located.

Therefore, when the specifying unit 332 specifies the locations of the utility poles 10, it first acquires vibration data at each distance like the one shown in FIG. 6. Then, the specifying unit 332 specifies parts having small magnitudes as the locations of utility poles 10. An image of a result of the specified location of each utility pole 10 is similar to that shown in FIG. 3.

(4) Fourth Method

Next, a fourth method for specifying the locations of utility poles 10 will be described.

In the fourth method, the specifying unit 332 performs machine learning (e.g., deep learning) for vibration patterns at locations where utility poles 10 are present, and specifies the locations of utility poles 10 by using the learning result of the machine learning (an initial training model).

Firstly, a method for performing machine learning in the fourth method will be described with reference to FIG. 7.

Figure 7:
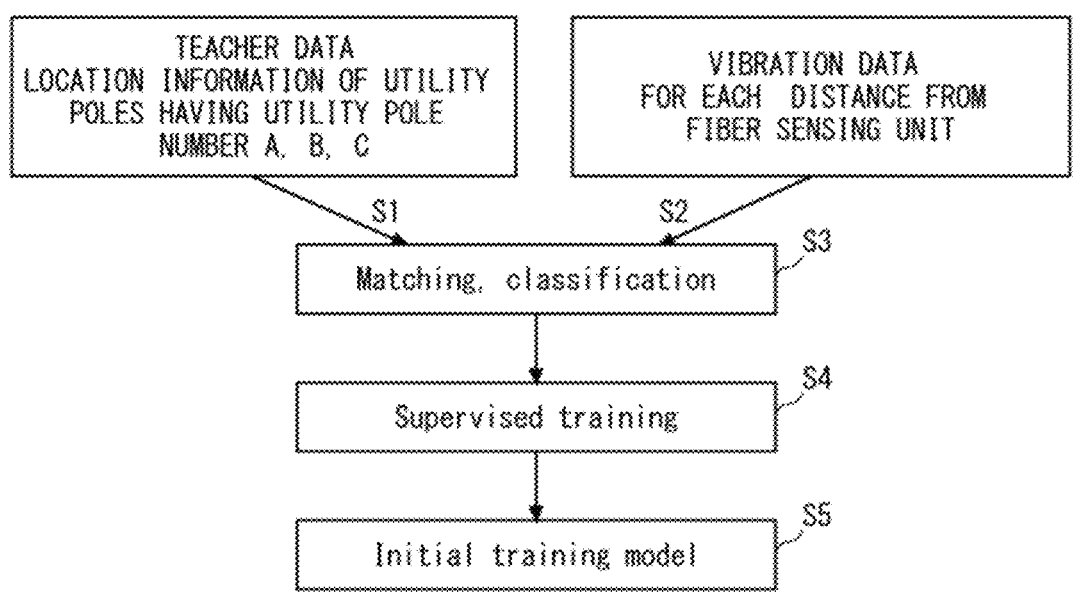
FIG. 7 shows an example of machine learning by a fourth method performed in a utility pole location specifying system according to an example embodiment.

As shown in FIG. 7, the specifying unit 332 inputs teacher data, which is location information indicating the locations of utility poles 10 having utility pole numbers A, B and C, and vibration data at each distance obtained from the fiber sensing unit 331 (steps S1 and S2). Note that the location information is one shown in FIG. 5. Further, the vibration data at each distance is those shown in FIGS. 2, 4 and 6.

Next, the specifying unit 332 performs matching between these information and data, and classification thereof (step S3), and performs supervised training (step S4). In this way, an initial training model is obtained (step S5). This initial training model is such a model that when vibration data at each distance is input to the initial training model, locations where utility poles 10 are present are output.

Next, a method for specifying locations of utility poles 10 in the fourth method will be described.

When the specifying unit 332 specifies the locations of utility poles 10, it acquires, from the fiber sensing unit 331, vibration data at each distance measured from the fiber sensing unit 331 (e.g., those shown in FIG. 2, 4 or 6) and inputs the acquired vibration data to the initial training model. As a result, the specifying unit 332 acquires the locations of utility poles 10 as a result output from the initial training model.

As described above, in the fourth method, machine learning for vibration data (vibration patterns) at locations where utility poles 10 are present is performed, and then the locations of utility poles 10 are specified by using the learning result of the machine learning.

In some cases, it is very difficult to extract features by which the locations of utility poles 10 are specified from vibration data by manually analyzing the vibration data. In the fourth method, it is possible, by constructing a training model from a large amount of vibration data, to accurately specify the locations of utility poles 10 even in the case where it is very difficult to manually analyze the vibration data.

Note that, in the machine learning in the fourth method, in the initial state, a training model may be generated based on at least two teacher data. Further, it is possible to make the generated training model newly learn distance-by-distance vibration data distance that is newly collected by the fiber sensing unit 331. In this case, details of the conditions for specifying the locations of utility poles 10 may be adjusted when the new training model is used for the first time.

Next, a hardware configuration of a computer 40 that implements the utility pole location specifying apparatus 33 will be described with reference to FIG. 8.

Figure 8:
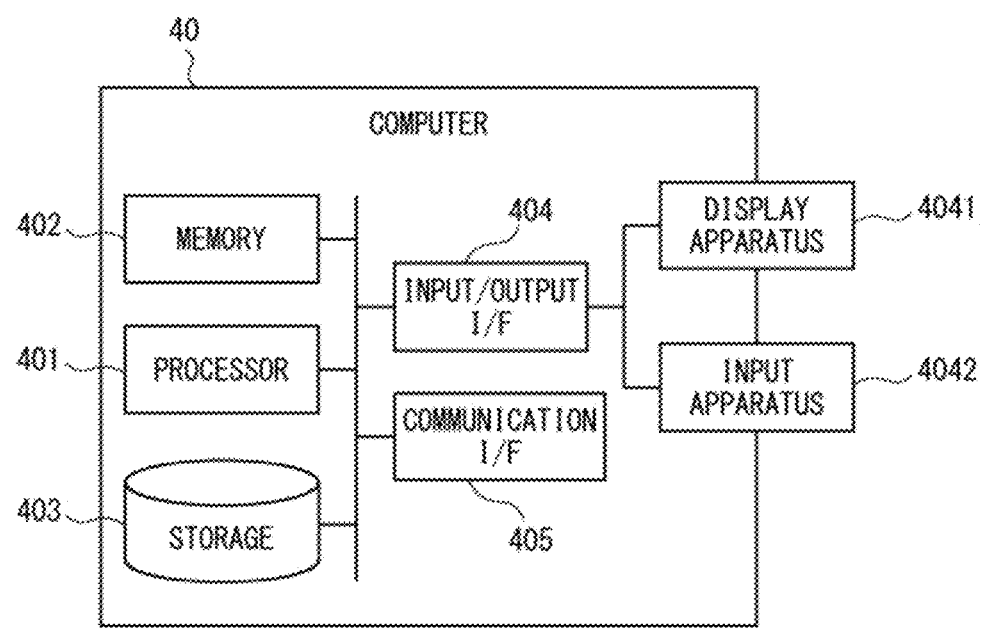
FIG. 8 is a block diagram showing an example of a hardware configuration of a computer that implements a utility pole location specifying apparatus according to an example embodiment.

As shown in FIG. 8, the computer 40 includes a processor 401, a memory 402, a storage 403, an input/output interface (an input/output I/F) 404, a communication interface (communication I/F) 405, and the like. The processor 401, the memory 402, the storage 403, the input/output interface 404, and the communication interface 405 are connected to each other through data transmission lines through which they transmit/receive data to/from each other.

The processor 401 is, for example, an arithmetic processing unit such as a CPU (Central Processing Unit) or a GPU (Graphics Processing Unit). The memory 402 is, for example, a memory such as a RAM (random access memory) or a ROM (Read Only Memory). The storage 403 is, for example, a storage device such as an HDD (Hard Disk Drive), an SSD (Solid State Drive), or a memory card. Further, the storage 403 may be a memory such as a RAM or a ROM.

The storage 403 stores programs for implementing the functions of the fiber sensing unit 331 and the specifying unit 332 included in the utility pole location specifying apparatus 33. The processor 401 implements the function of each of the fiber sensing unit 331 and the specifying unit 332 by executing the respective programs. Note that when the processor 401 executes these respective programs, it may execute the programs after loading them onto the memory 402 or may execute the programs without loading them onto the memory 402. Further, the memory 402 and the storage 403 also have a function of storing information and data held by the fiber sensing unit 331 and the specifying unit 332.

Further, the above-described program can be stored and provided to a computer (including the computer 40) using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The input/output interface 404 is connected to a display apparatus 4041, an input apparatus 4042, and the like. The display apparatus 4041 is an apparatus, such as an LCD (Liquid Crystal Display) or a CRT (Cathode Ray Tube) display, which displays an image corresponding to drawing data processed by processor 401. The input apparatus 4042 is an apparatus that receives an operation input from an operator, and is, for example, a keyboard, a mouse, and a touch sensor. The display apparatus 4041 and the input apparatus 4042 may be integrated with each other and hence implemented as a touch panel. Note that the computer 40 may also include sensors (not shown) including a distributed acoustic sensor and a distributed vibration sensor, and have a configuration in which these sensors are connected to the input/output interface 404.

The communication interface 405 transmits/receives data to/from an external apparatus. For example, the communication interface 405 communicates with an external apparatus through a wired communication line or a radio communication channel.

Operation in Example Embodiment

Operation performed by the utility pole location specifying system according to this example embodiment will be described hereinafter. Here, a flow of operations performed by the utility pole location specifying system according to this example embodiment will be described with reference to FIG. 9.

Figure 9:
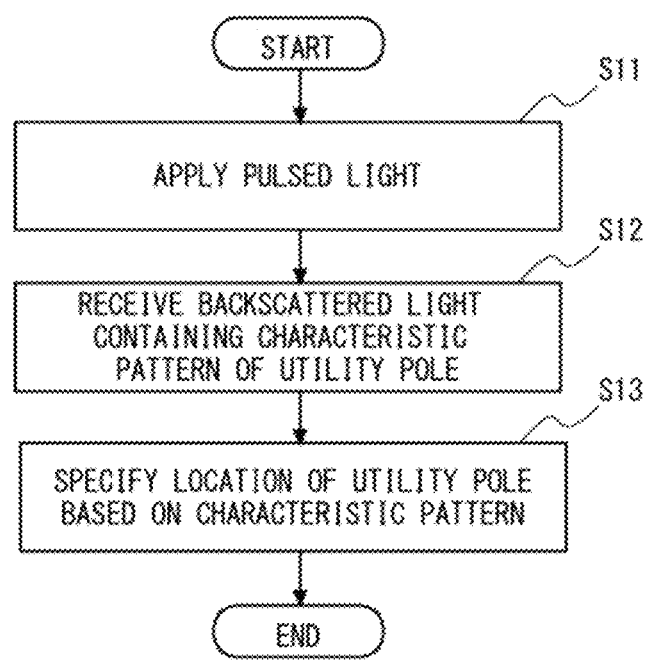
FIG. 9 is a flowchart showing an example of a flow of operations performed by a utility pole location specifying system according to an example embodiment.

As shown in FIG. 9, firstly, the fiber sensing unit 331 makes pulsed light enter at least one communication optical fiber contained in the optical fiber cable 20 (step S11).

Next, the fiber sensing unit 331 receives backscattered light containing characteristic patterns of utility poles 10 from the same communication optical fiber to which the pulsed light has entered (step S12).

After that, the specifying unit 332 specifies the locations of utility poles 10 based on the characteristic patterns of the utility poles 10 contained in the backscattered light received by the fiber sensing unit 331 (step S13). Note that the specifying unit 332 may specify the locations of the utility poles 10 by using one of the above-described first to fourth methods.

Effect of Example Embodiment

As described above, according to this example embodiment, backscattered light (optical signals) containing characteristic patterns of utility poles 10 is received from at least one communication optical fiber contained in the optical fiber cable 20, and the locations of the utility poles 10 are specified based on the characteristic patterns of the utility poles 10. Therefore, it is possible to accurately and automatically specify the locations of utility poles.

Further, according to this example embodiment, it is sufficient to have an existing communication optical fiber in order to specify the locations of utility poles 10. That is, unlike Patent Literature 1, there is no need to linearly or spirally dispose an optical fiber in the vertical direction of a utility pole, and unlike Patent Literature 2, there is no need to dispose a nesting detection core line in a utility pole. Therefore, since the utility pole location specifying system requires no dedicated structure in order to specify the locations of utility poles 10, it can be constructed at a low cost.

Further, according to this example embodiment, it is possible to simultaneously and remotely specify the locations of a plurality of utility poles 10 by using an existing communication optical fiber. Therefore, it is possible to easily specify the locations of utility poles 10 and reduce the cost required to specify the locations of utility poles 10.

Further, according to this example embodiment, an optical fiber sensing technique in which an optical fiber is used as a sensor is used. Therefore, for example, there are following advantages: the system is not affected by electromagnetic noises; there is no need to supply power to the sensor; the system has an excellent environmental resistance; and the maintenance thereof is easy.

Other Example Embodiment

It should be noted that each of the utility poles 10 may have a different characteristic pattern.

In this case, for example, the specifying unit 332 holds a correspondence table in which the characteristic patterns of utility poles 10 are associated with information about the utility poles 10 (e.g., utility pole numbers, types, and the like of the utility poles 10), so that the specifying unit 332 can specify the locations of the utility poles 10 based on the characteristic patterns of the utility poles 10 contained in the optical signal received by the fiber sensing unit 331.

Further, the characteristic pattern of a utility pole 10 changes according to the type of the utility pole 10 (e.g., the material of the utility pole 10) or the state of the utility pole 10 (e.g., the deterioration state of the utility pole 10).

Figure 10:
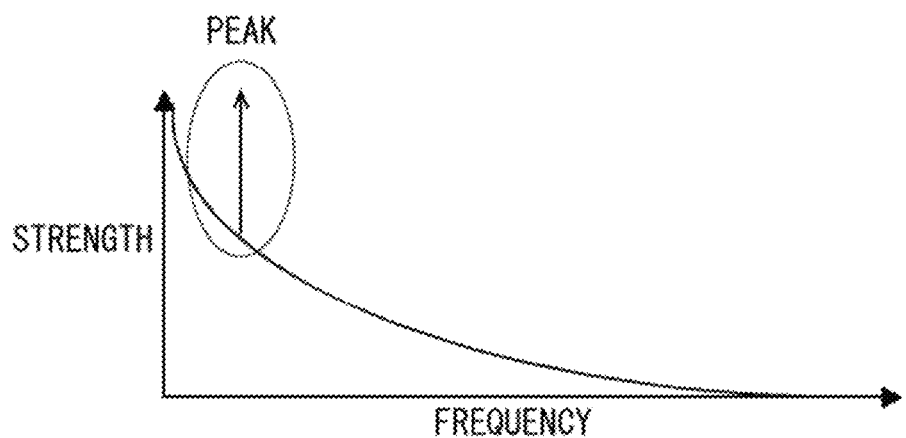
FIG. 10 shows an example of a frequency characteristic of vibration data of a type-X utility pole.
Figure 11:
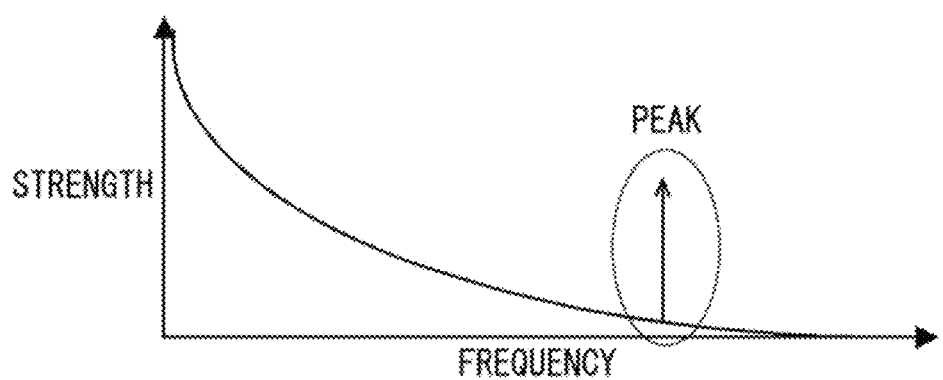
FIG. 11 shows an example of a frequency characteristic of vibration data of a type-Y utility pole.

The fact that the characteristic pattern of a utility pole 10 changes according to the type of the utility pole 10 will be explained hereinafter with reference to FIGS. 10 and 11. Note that FIGS. 10 and 11 show frequency characteristics (a horizontal axis indicates frequencies and a vertical axis indicates magnitudes (amplitudes)) of vibration data (a horizontal axis indicates time and a vertical axis indicates magnitudes (amplitudes)) of a utility pole 10 after an FFT (Fast Fourier Transform) is performed for the vibration data. In particular, FIG. 10 shows a frequency characteristic of vibration data of an X-type utility pole 10, and FIG. 11 shows a frequency characteristic of vibration data of a Y-type utility pole 10. Note that the frequency characteristics shown in FIGS. 10 and 11 were obtained by the fiber sensing unit 331 by detecting backscattered light received from the communication optical fiber by using a distributed acoustic sensor and a distributed vibration sensor.

As shown in FIG. 10, in the case of the X-type utility pole 10, a peak of the strength appears in a low frequency band irrespective of the deterioration state of the utility pole 10. In contrast, as shown in FIG. 11, in the case of the Y-type utility pole 10, a peak of the strength appears in a high frequency band irrespective of the deterioration state of the utility pole 10.

Therefore, for example, the specifying unit 332 holds a correspondence table in which the characteristic patterns of utility poles 10 are associated with the types of the utility poles 10, so that the specifying unit 332 can specify the types of these utility poles 10 based on the characteristic patterns of the utility poles 10 contained in the optical signal received by the fiber sensing unit 331.

Further, although not shown in the drawing, the characteristic pattern of a utility pole 10 also changes according to the state of the utility poles 10. Therefore, the specifying unit 332 can also specify the state of the utility poles 10 by holding a correspondence table in which the characteristic patterns of utility poles 10 are associated with the states of the utility poles 10.

Further, the specifying unit 332 may generate a map indicating the locations of a plurality of utility poles 10 through which the optical fiber cables 20 are strung (e.g., stretched). Further, the specifying unit 332 may associate the locations of the utility poles 10 with the types or the states of the utility poles 10 specified as described above in the above-described map.

Further, similar to the above-described fourth method, the specifying unit 332 may perform machine learning for the characteristic patterns of the utility poles 10 according to the types of the utility poles 10 or perform machine learning for the characteristic patterns of the utility poles 10 according to the states of the utility poles 10, and specify the types or the states of the utility poles 10 by using the learning result of the machine learning.

Further, in the case where the specifying unit 332 performs machine learning for the characteristic patterns of the utility poles 10 by the above-described fourth method or the like, it is considered that the characteristic patterns of the utility poles 10 also change depending on the region. For example, the characteristic patterns in a temperate region are different from those in a cold region. Therefore, the specifying unit 332 may perform machine learning for each region by using teacher data corresponding to that region.

Figure 12:
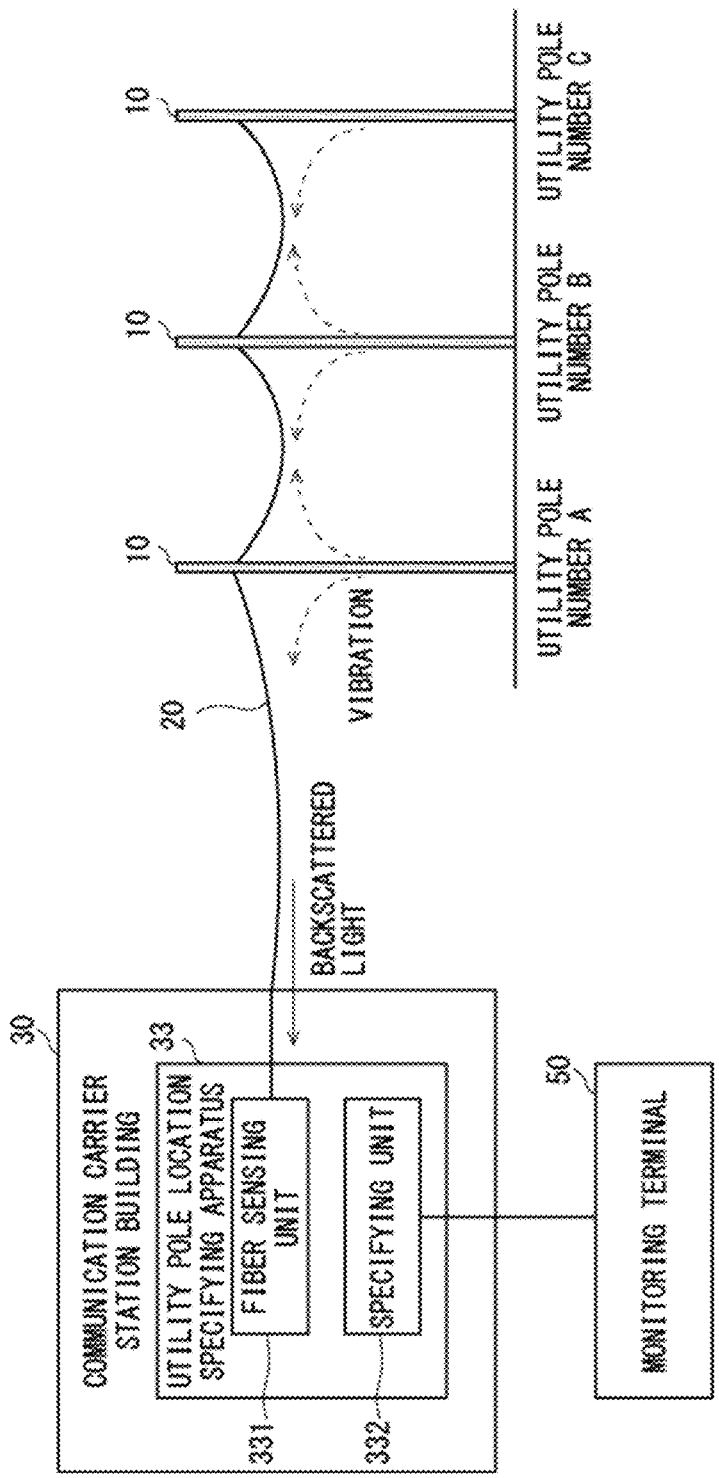
FIG. 12 shows an example of a utility pole location specifying system according to another example embodiment.

Further, as shown in FIG. 12, a monitoring terminal 50 that monitors the utility poles 10 based on the result of the specifying process performed by the utility pole location specifying apparatus 33 may be provided. The monitoring terminal 50 may show the locations of utility poles 10 to a system administrator or the like as a result of the specifying process performed by the utility pole location specifying apparatus 33. Further, although the monitoring terminal 50 is provided outside the communication carrier station building 30 in the drawing, it may be provided inside the communication carrier station building 30. Further, when the monitoring terminal 50 is provided outside the communication carrier station building 30, utility poles 10 that are connected to a plurality of respective communication carrier station buildings 30 by optical fiber cables 20 may be monitored by one monitoring terminal 50 in a centralized manner.

Further, the fiber sensing unit 331 and the specifying unit 332 of the utility pole location specifying apparatus 33 are disposed remotely from each other. For example, only the fiber sensing unit 331 may be provided inside the communication carrier station building 30, and the utility pole location specifying apparatus 33 including the specifying unit 332 may be provided outside the communication carrier station building 30.

Further, in the above-described example embodiment, only one fiber sensing unit 331 is provided and it exclusively use the optical fiber cable 20. However, the present disclosure is not limited to this example. The disposition of a fiber sensing unit 331 in a utility pole location specifying system according to other example embodiments will be described with reference to FIGS. 13 to 16. Note that, in FIGS. 13 to 16, the illustration of the specifying unit 332 is omitted.

Figure 13:
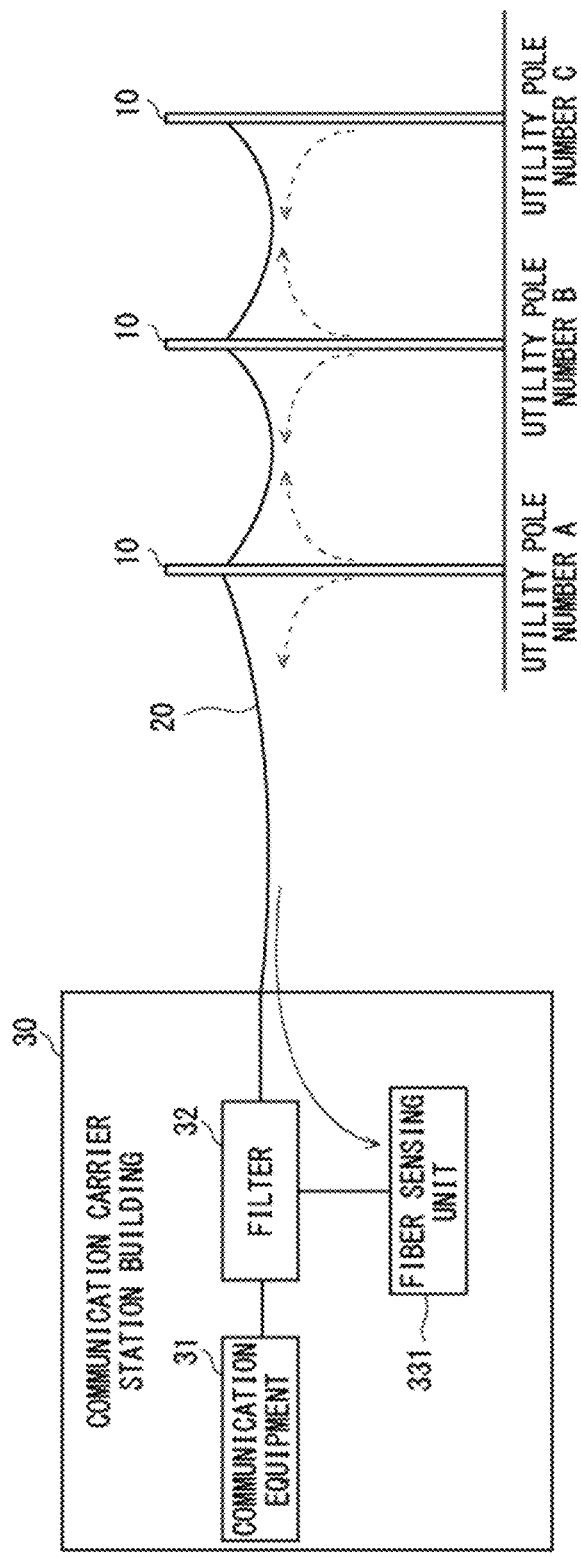
FIG. 13 shows an example of a disposition of a fiber sensing unit in a utility pole location specifying system according to another example embodiment.

In an example shown in FIG. 13, the fiber sensing unit 331 shares the optical fiber cable 20 with existing communication equipment 31. Further, in order to enable the fiber sensing unit 331 and the existing communication equipment 31 to share the optical fiber cable 20, a filter 32 for separating signals is provided.

Figure 14:
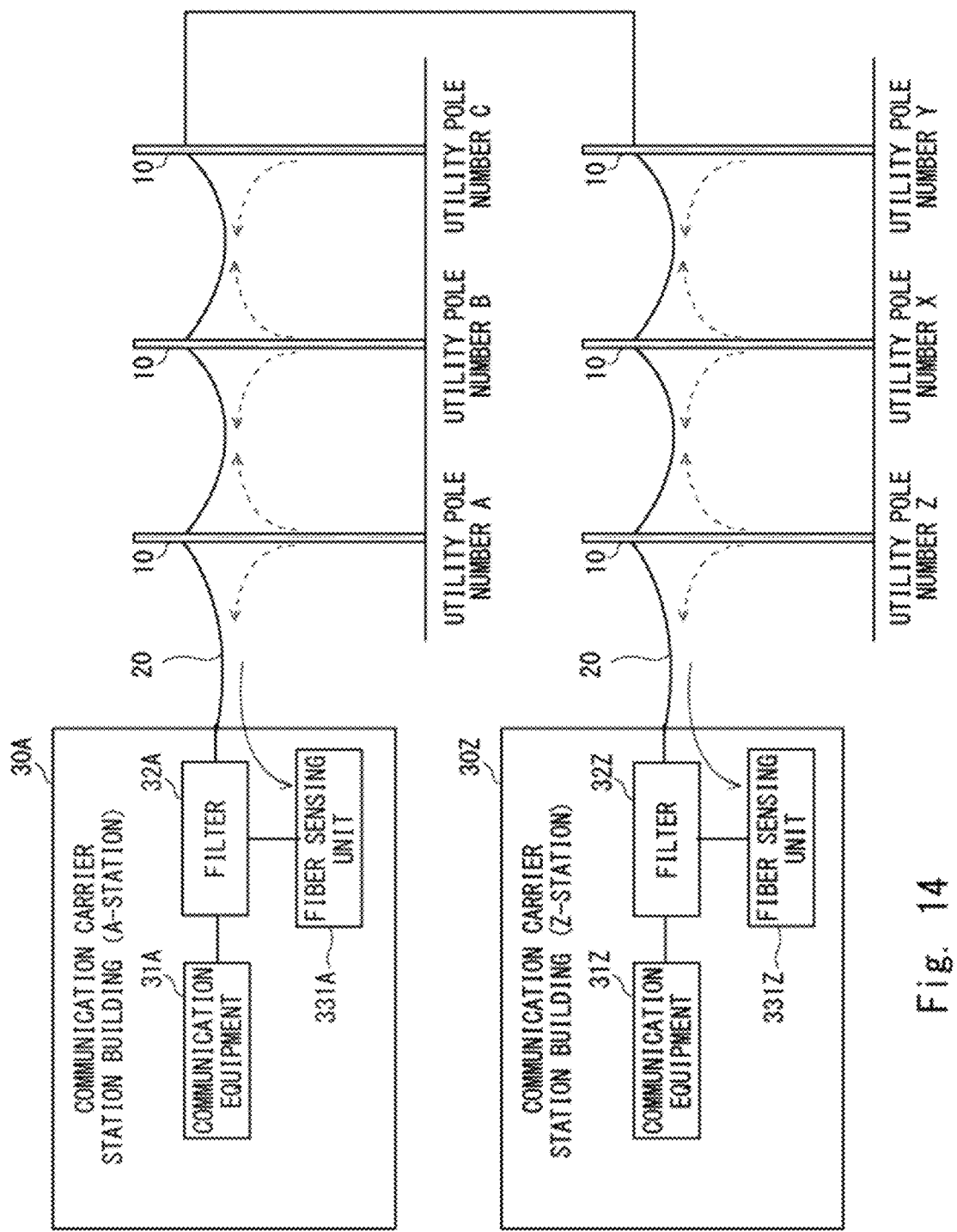
FIG. 14 shows another example of a disposition of a fiber sensing unit in a utility pole location specifying system according to another example embodiment.

In an example shown in FIG. 14, one fiber sensing unit 331 is provided in each of a plurality of communication carrier station buildings 30 (one fiber sensing unit 331 is provided in each of two communication carrier station buildings 30A and 30Z in FIG. 14). Specifically, fiber sensing units 331A and 331Z are provided in the communication carrier station buildings 30A and 30Z, respectively.

Note that, in the example shown in FIG. 14, utility poles 10 having utility pole numbers A, B and C are connected to the communication carrier station building 30A by an optical fiber cable 20, and utility poles 10 having utility pole numbers X, Y and Z are connected to the communication carrier station building 30Z by another optical fiber cable 20. Further, the utility poles 10 having the utility pole numbers C and Y are connected to each other by another optical fiber cable 20. The communication equipment 31A and 31Z correspond to the communication equipment 31, and the filters 32A and 32Z correspond to the filter 32.

In the example shown in FIG. 14, both the fiber sensing units 331A and 331Z monitor the utility poles 10 having the utility pole numbers A, B, C, X, Y and Z.

Figure 15:
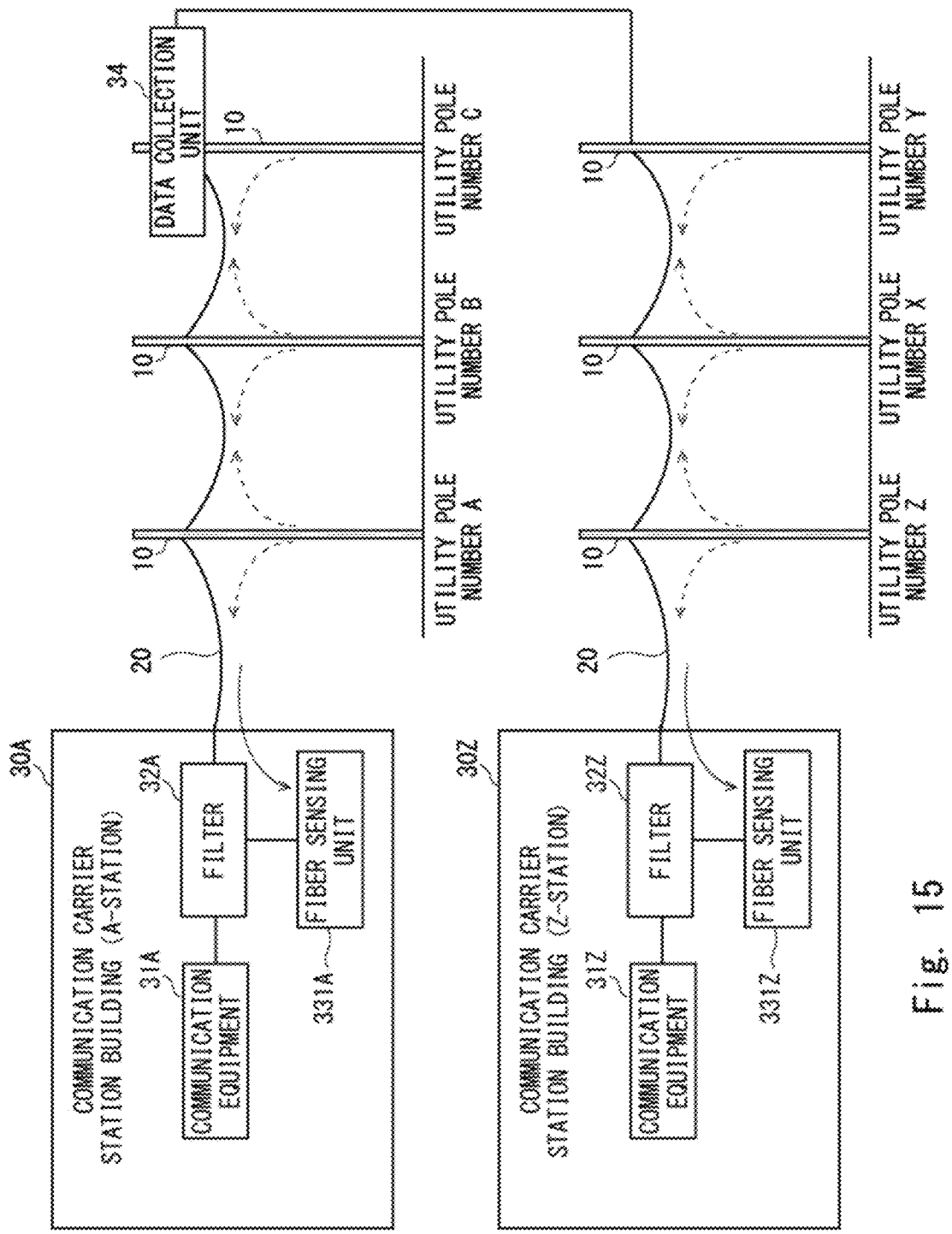
FIG. 15 shows yet another example of a disposition of a fiber sensing unit in a utility pole location specifying system according to another example embodiment.

In an example shown in FIG. 15, a data collection unit 34 is provided in a utility pole 10 having a utility pole number C as compared to the example shown in FIG. 14. Note that since the number of utility poles 10 is six, only one data collection unit 34 is provided. However, one data collection unit 34 may be provided for a predetermined number of utility poles 10 (e.g., for ten utility poles 10). That is, at least one data collection unit 34 may be provided. For example, in the case where the optical fiber cable 20 is strung (e.g., stretched) through 100 utility poles 10, one data collection unit 34 may be provided for every ten utility poles 10. That is, ten data collection units 34 may be provided in total.

In the example shown in FIG. 15, each of the data collection units 34 collects data about patterns (sounds, temperatures, vibrations, etc.) of a predetermined number of corresponding utility poles 10, and the specifying unit 332 summarizes the data collected by all the data collection units 34. Note that the data may be transmitted from each of the data collection units 34 to the specifying unit 332 through the optical fiber cable 20, or may be transmitted through a separately provided radio apparatus. The specifying unit 332 specifies the locations of utility poles 10, of which the data collection unit(s) 34 has collected data, based on their data.

Therefore, the section that is monitored by one fiber sensing unit 331 is shortened, and the number of utility poles 10 that are monitored by one fiber sensing unit 331 is reduced. Since the section monitored by the fiber sensing unit 331 is shortened, the distance of the transmission of the pulsed light and the backscattered light is also shortened, so that the loss caused by the fiber is reduced. As a result, the S/N ratio (the signal-to-noise ratio) of the received backscattered light is improved, so that the monitoring accuracy can be improved. Further, since the number of utility poles 10 monitored by the fiber sensing unit 331 is reduced, the monitoring cycle can be improved.

Figure 16:
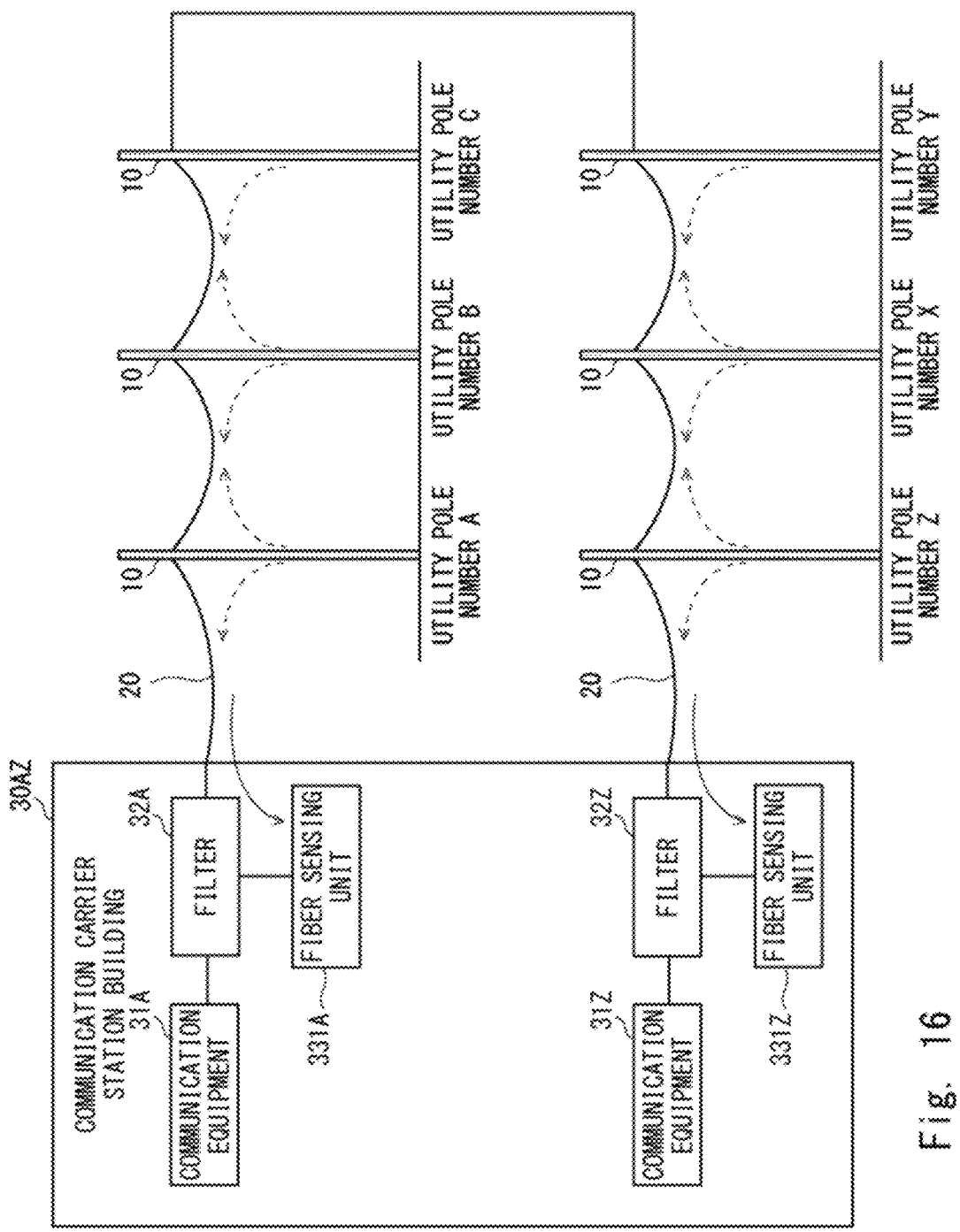
FIG. 16 shows yet another example of a disposition of a fiber sensing unit in a utility pole location specifying system according to another example embodiment.

In an example shown in FIG. 16, a plurality of fiber sensing units 331 (two fiber sensing units 331A and 331Z in FIG. 16) are provided in one communication carrier station building 30AZ. Note that, in the example shown in FIG. 16, utility poles 10 having utility pole numbers A, B and C are connected to the fiber sensing unit 331A by an optical fiber cable 20, and utility poles 10 having utility pole numbers X, Y and Z are connected to the fiber sensing unit 331Z by another optical fiber cable 20. Further, the utility poles 10 having the utility pole numbers C and Y are connected to each other by another optical fiber cable 20. The communication equipment 31A and 31Z correspond to the communication equipment 31, and the filters 32A and 32Z correspond to the filter 32.

In the example shown in FIG. 16, both the fiber sensing units 331A and 331Z monitor the utility poles 10 having the utility pole numbers A, B, C, X, Y and Z. However, the fiber sensing unit 331A monitors the utility poles 10 by making pulsed light enter the optical fiber in a clockwise direction, and the fiber sensing unit 331Z monitors the utility poles 10 by making pulsed light enter the optical fiber in a counter-clockwise direction.

Note that in the case where a plurality of fiber sensing units 331 are provided as shown in FIGS. 14 to 16, one utility pole location specifying apparatus 33 including a specifying unit 332 may be provided for the plurality of fiber sensing units 331. Further, the locations of utility poles 10 that are connected to a plurality of respective fiber sensing units 331 by optical fiber cables 20 may be specified by one utility pole location specifying apparatus 33 in a centralized manner. In this case, the utility pole location specifying apparatus 33 may be provided in the inside of one of the communication carrier station buildings 30, or may be provided outside the communication carrier station buildings 30.

Further, there is a possibility that the optical fiber cable 20 strung (e.g., stretched) through the utility poles 10 is broken. Therefore, operations that are performed by the fiber sensing unit 331 when the optical fiber cable 20 is broken in a utility pole location specifying system according to other example embodiments will be described with reference to FIGS. 17 to 19. Note that, in FIGS. 17 to 19, the illustration of the specifying unit 332 is omitted.

Figure 17:
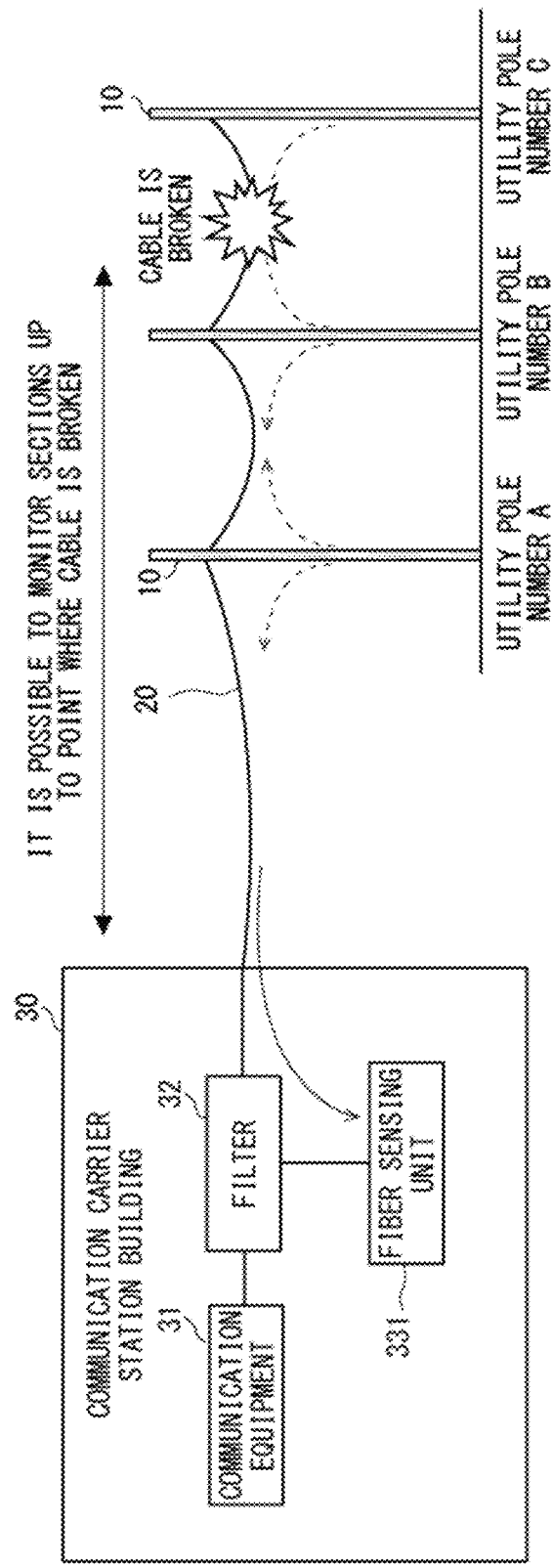
FIG. 17 shows an example of an operation that is performed by the fiber sensing unit when an optical fiber cable is broken in the utility pole location specifying system shown in FIG. 13.

An example shown in FIG. 17 is an example in which a part of the optical fiber cable 20 located between the utility poles 10 having the utility pole numbers B and C is broken in the configuration shown in FIG. 13. The fiber sensing unit 331 continues making the pulsed light enter the optical fiber cable 20 even when the optical fiber cable 20 is broken. In this way, the communication carrier station building 30 can continuously monitor the sections up to the place where the optical fiber cable is broken.

Figure 18:
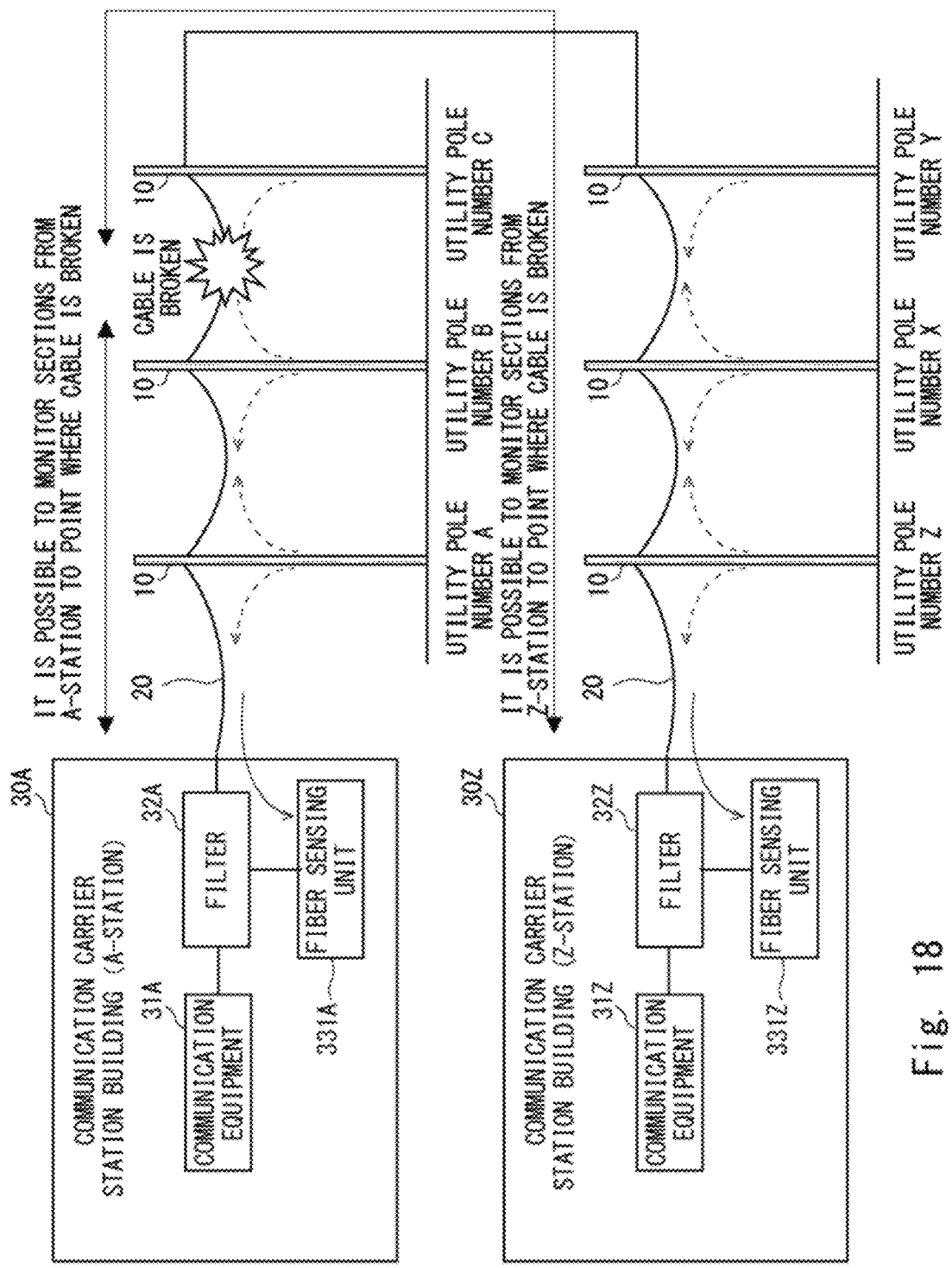
FIG. 18 shows an example of an operation that is performed by the fiber sensing unit when an optical fiber cable is broken in the utility pole location specifying system shown in FIG. 14.

An example shown in FIG. 18 is an example in which a part of the optical fiber cable 20 located between the utility poles 10 having the utility pole numbers B and C is broken in the configuration shown in FIG. 14. The fiber sensing units 331A and 331Z continues making the pulsed light enter the optical fiber cable 20 even when the optical fiber cable 20 is broken. Note that each of the utility poles 10 is connected to at least two communication carrier station buildings 30 (two communication carrier station buildings 30A and 30Z in FIG. 18) without exception. Therefore, by having the communication carrier station buildings 30A and 30Z monitor the utility poles in both the directions, it is possible to form a redundant configuration by which all the sections can be continuously monitored in the case of a single failure.

Figure 19:
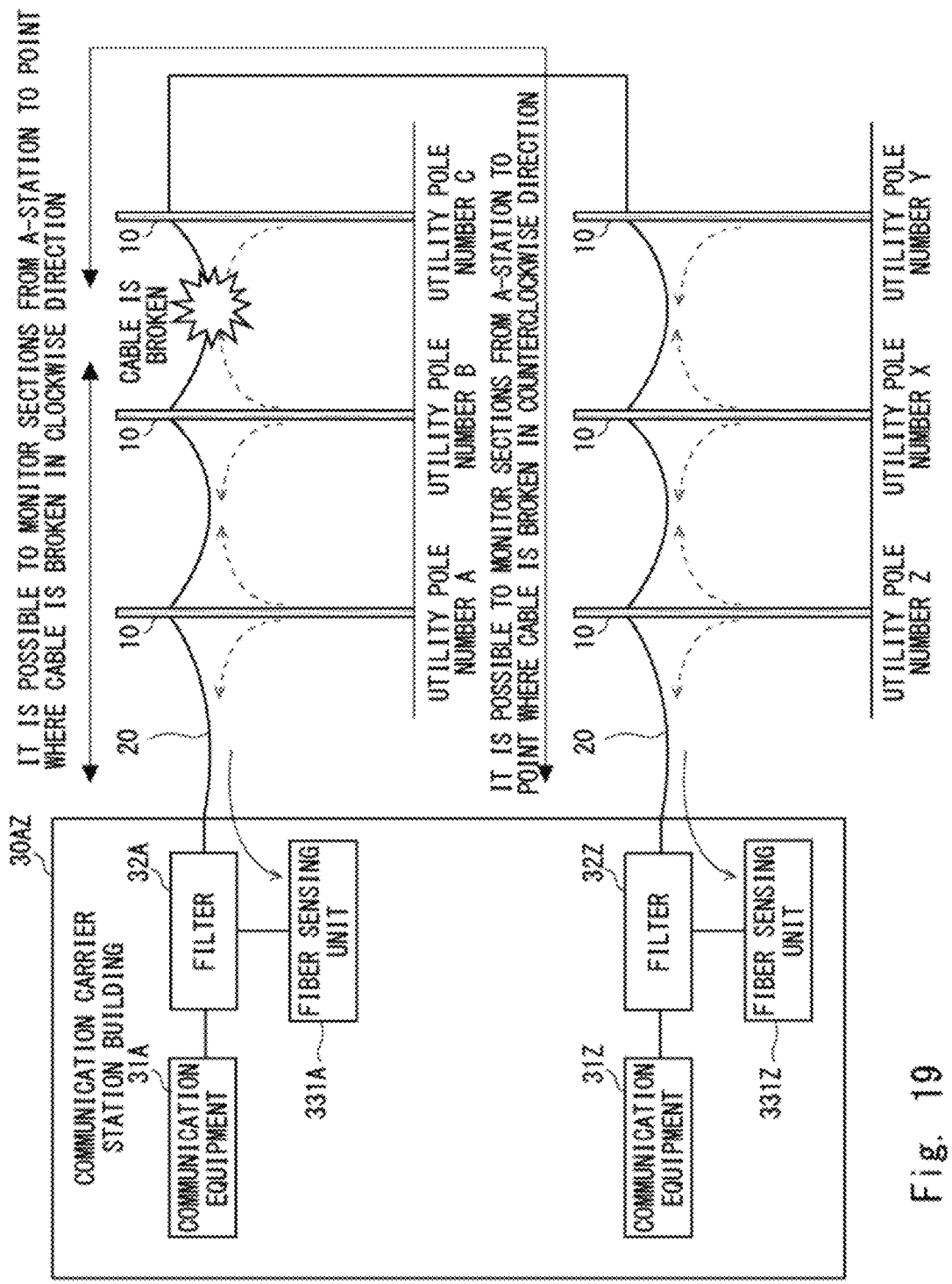
FIG. 19 shows an example of an operation that is performed by the fiber sensing unit when an optical fiber cable is broken in the utility pole location specifying system shown in FIG. 16.

An example shown in FIG. 19 is an example in which a part of the optical fiber cable 20 located between the utility poles 10 having the utility pole numbers B and C is broken in the configuration shown in FIG. 16. The fiber sensing units 331A and 331Z continues making the pulsed light enter the optical fiber cable 20 even when the optical fiber cable 20 is broken. Note that, in the example shown in FIG. 19, a ring configuration in which the optical fiber cables 20 are connected in a ring shape is formed. Therefore, by having the one communication carrier station building 30AZ monitor the utility poles in both the directions of the ring, it is possible to form a redundant configuration by which all the sections can be continuously monitored in the case of a single failure.

Although the present disclosure is explained above with reference to embodiments, the present disclosure is not limited to the above-described embodiments. Various modifications that can be understood by those skilled in the art can be made to the configuration and details of the present disclosure within the scope of the invention.

The whole or part of the embodiments disclosed above can be described as, but not limited to, the following supplementary notes.

(Supplementary Note 1)

A utility pole location specifying system comprising:

a cable disposed in a utility pole, the cable containing a communication optical fiber;

a receiving unit configured to receive an optical signal containing a characteristic pattern of the utility pole from at least one communication optical fiber contained in the cable; and a specifying unit configured to specify a location of the utility pole based on the characteristic pattern.

(Supplementary Note 2)

The utility pole location specifying system described in Supplementary note 1, wherein each of the utility poles has s different characteristic pattern, and the specifying unit specifies a location of a predetermined utility pole based on the characteristic pattern.

(Supplementary Note 3)

The utility pole location specifying system described in Supplementary note 1, wherein the characteristic pattern of a utility pole changes according to a type or a state thereof, and the specifying unit specifies the type or the state of the utility pole based on the characteristic pattern.

(Supplementary Note 4)

The utility pole location specifying system described in any one of Supplementary notes 1 to 3, wherein the characteristic pattern is a pattern artificially generated in the utility pole.

(Supplementary Note 5)

The utility pole location specifying system described in any one of Supplementary notes 1 to 3, wherein the characteristic pattern is a pattern non-artificially generated in the utility pole.

(Supplementary Note 6)

The utility pole location specifying system described in any one of Supplementary notes 1 to 5, wherein the specifying unit learns the characteristic pattern at a place where the utility pole is present, and specifies the location of the utility pole based on a result of the learning and the characteristic pattern contained in the optical signal received by the receiving unit.

(Supplementary Note 7)

The utility pole location specifying system described in any one of Supplementary notes 1 to 6, wherein the cable is disposed substantially perpendicular to a longitudinal direction of the utility pole.

(Supplementary Note 8)

A utility pole location specifying apparatus comprising:

a receiving unit configured to receive an optical signal containing a characteristic pattern of a utility pole from at least one communication optical fiber contained in a cable disposed in the utility pole; and a specifying unit configured to specify a location of the utility pole based on the characteristic pattern.

(Supplementary Note 9)

The utility pole location specifying apparatus described in Supplementary note 8, wherein each of the utility poles has s different characteristic pattern, and the specifying unit specifies a location of a predetermined utility pole based on the characteristic pattern.

(Supplementary Note 10)

The utility pole location specifying apparatus described in Supplementary note 8, wherein the characteristic pattern of a utility pole changes according to a type or a state thereof, and the specifying unit specifies the type or the state of the utility pole based on the characteristic pattern.

(Supplementary Note 11)

The utility pole location specifying apparatus described in any one of Supplementary notes 8 to 10, wherein the characteristic pattern is a pattern artificially generated in the utility pole.

(Supplementary Note 12)

The utility pole location specifying apparatus described in any one of Supplementary notes 8 to 10, wherein the characteristic pattern is a pattern non-artificially generated in the utility pole.

(Supplementary Note 13)

The utility pole location specifying apparatus described in any one of Supplementary notes 8 to 12, wherein the specifying unit learns the characteristic pattern at a place where the utility pole is present, and specifies the location of the utility pole based on a result of the learning and the characteristic pattern contained in the optical signal received by the receiving unit.

(Supplementary Note 14)

The utility pole location specifying apparatus described in any one of Supplementary notes 8 to 13, wherein the cable is disposed substantially perpendicular to a longitudinal direction of the utility pole.

(Supplementary Note 15)

A utility pole location specifying method performed by a utility pole location specifying apparatus, comprising:

receiving an optical signal containing a characteristic pattern of a utility pole from at least one communication optical fiber contained in a cable disposed in the utility pole; and specifying a location of the utility pole based on the characteristic pattern.

(Supplementary Note 16)

A non-transitory computer readable medium storing a program for causing a computer to perform:

a process of receiving an optical signal containing a characteristic pattern of a utility pole from at least one communication optical fiber contained in a cable disposed in the utility pole; and a process of specifying a location of the utility pole based on the characteristic pattern.

This application is based upon and claims the benefit of priority from Japanese patent applications No. 2018-162040, filed on Aug. 30, 2018, the disclosure of which is incorporated herein in its entirety by reference.

REFERENCE SIGNS LIST

10 UTILITY POLE
20 OPTICAL FIBER CABLE
30, 30A, 30Z, 30AZ COMMUNICATION CARRIER STATION BUILDING
31, 31A, 31Z COMMUNICATION EQUIPMENT
32, 32A, 32Z FILTER
33 UTILITY POLE LOCATION SPECIFYING APPARATUS
331, 331A, 331Z FIBER SENSING UNIT
332 SPECIFYING UNIT
34 DATA COLLECTION UNIT
40 COMPUTER
401 PROCESSOR
402 MEMORY
403 STORAGE
404 INPUT/OUTPUT INTERFACE
4041 DISPLAY APPARATUS
4042 INPUT APPARATUS
405 COMMUNICATION INTERFACE
50 MONITORING TERMINAL

The invention claimed is:

1. A utility pole location specifying system comprising:
a cable disposed in a utility pole, the cable containing a communication optical fiber;
receiver circuitry configured to receive an optical signal containing a vibration pattern characteristic of the utility pole from the communication optical fiber contained in the cable; and
processing circuitry configured to specify a location of the utility pole based on the vibration pattern characteristic.

2. The utility pole location specifying system according to claim 1, wherein
the utility pole is included in a plurality of utility poles,
each of the plurality of utility poles has a different vibration pattern characteristic, and
the processing circuitry specifies a location of a predetermined utility pole based on the vibration pattern characteristic.

3. The utility pole location specifying system according to claim 1,
wherein
the vibration pattern characteristic of a utility pole changes according to a type or a state thereof, and
the processing circuitry specifies the type or the state of the utility pole based on the vibration pattern characteristic.

4. The utility pole location specifying system according to claim 1, wherein the vibration pattern characteristic is a pattern artificially generated in the utility pole.

5. The utility pole location specifying system according to claim 1, wherein the vibration pattern characteristic is a pattern non-artificially generated in the utility pole.

6. The utility pole location specifying system according to claim 1, wherein the processing circuitry learns the vibration pattern characteristic at a place where the utility pole is present, and specifies the location of the utility pole based on a result of the learning and the vibration pattern characteristic contained in the optical signal received by the receiver circuitry.

7. The utility pole location specifying system according to claim 1, wherein the cable is disposed substantially perpendicular to a longitudinal direction of the utility pole.

8. A utility pole location specifying apparatus comprising:
receiver circuitry configured to receive an optical signal containing a vibration pattern characteristic of a utility pole from at least one communication optical fiber contained in a cable disposed in the utility pole; and
processing circuitry configured to specify a location of the utility pole based on the vibration pattern characteristic.

9. The utility pole location specifying apparatus according to claim 8, wherein
the utility pole is included in a plurality of utility poles,
each of the plurality of utility poles has a different vibration pattern characteristic, and
the processing circuitry specifies a location of a predetermined utility pole based on the vibration pattern characteristic.

10. The utility pole location specifying apparatus according to claim 8, wherein
the vibration pattern characteristic of a utility pole changes according to a type or a state thereof, and
the processing circuitry specifies the type or the state of the utility pole based on the vibration pattern characteristic.

11. The utility pole location specifying apparatus according to claim 8, wherein the vibration pattern characteristic is a pattern artificially generated in the utility pole.

12. The utility pole location specifying apparatus according to claim 8, wherein the vibration pattern characteristic is a pattern non-artificially generated in the utility pole.

13. The utility pole location specifying apparatus according to claim 8, wherein the processing circuitry learns the vibration pattern characteristic at a place where the utility pole is present, and specifies the location of the utility pole based on a result of the learning and the vibration pattern characteristic contained in the optical signal received by the receiver circuitry.

14. The utility pole location specifying apparatus according to claim 8, wherein the cable is disposed substantially perpendicular to a longitudinal direction of the utility pole.

15. A utility pole location specifying method performed by a utility pole location specifying apparatus, comprising:
receiving an optical signal containing a vibration pattern characteristic of a utility pole from at least one communication optical fiber contained in a cable disposed in the utility pole; and
specifying a location of the utility pole based on the vibration pattern characteristic.

* * * * *